United States Patent [19]
Yamaguchi

[11] Patent Number: 5,568,635
[45] Date of Patent: Oct. 22, 1996

[54] PHYSICAL MEMORY ALLOCATION SYSTEM, PROGRAM EXECUTION SCHEDULING SYSTEM, AND INFORMATION PROCESSOR

[75] Inventor: Ryuichi Yamaguchi, Osaka, Japan

[73] Assignee: Matsushita Electric Industrial Co., Ltd., Osaka, Japan

[21] Appl. No.: 200,489

[22] Filed: Feb. 23, 1994

[30] Foreign Application Priority Data

Feb. 24, 1993 [JP] Japan ................................... 5-033853

[51] Int. Cl.$^6$ ................................................. G06F 12/02
[52] U.S. Cl. ............... 395/497.02; 395/485; 395/497.03; 364/DIG. 1
[58] Field of Search .................. 364/200 MS, 900 MS; 395/425, 497.01, 497.02, 497.03, 497.04, 600

[56] References Cited

U.S. PATENT DOCUMENTS

| | | | |
|---|---|---|---|
| 4,455,602 | 6/1984 | Baxter et al. | 395/775 |
| 4,642,790 | 2/1987 | Minshull et al. | 395/158 |
| 4,852,001 | 7/1989 | Tsushima et al. | 364/401 |
| 4,896,269 | 1/1990 | Tong | 364/468 |
| 4,984,150 | 1/1991 | Mori | 364/200 |
| 5,109,336 | 4/1992 | Guenther et al. | 395/497.02 |
| 5,129,088 | 7/1992 | Auslander et al. | 395/700 |
| 5,159,681 | 10/1992 | Beck et al. | 395/116 |
| 5,333,319 | 7/1994 | Silen | 395/650 |
| 5,394,531 | 2/1995 | Smith | 395/463 |
| 5,418,929 | 5/1995 | Tsuboi et al. | 395/497.02 |

FOREIGN PATENT DOCUMENTS

| | | |
|---|---|---|
| 62-276645 | 12/1987 | Japan . |
| 1-161443 | 6/1989 | Japan . |

*Primary Examiner*—Matthew M. Kim
*Attorney, Agent, or Firm*—McDermott, Will & Emery

[57] ABSTRACT

A physical memory allocation system comprising an area estimation section, a program modification section, a program size read-in section, a memory size read-in section, a user control table, a size compare section, and an area allocation section. The area estimation section, after a program has been run for a predetermined period of time, measures a memory area size referred to by the program (i.e. the program size). The program modification section writes the program size to the program. The program size read-in section inputs the program size and the memory size read-in section inputs a user allocation size held at the user control table at program execution time. The size compare section makes a comparison in size between the user allocation size and the program size thereby outputting one of these two sizes that is found to be smaller than the other as an at-execution-time size. In the area allocation section, an amount of physical memory that a program can use is taken as an at-execution-time size. Taking such a physical memory size as a low limit, physical memory allocation is carried out effectively. This reduces the frequency of swapping and the loss of time.

5 Claims, 8 Drawing Sheets

PHYSICAL MEMORY ALLOCATION SYSTEM, PROGRAM EXECUTION SCHEDULING SYSTEM, AND INFORMATION PROCESSOR

TECHNICAL FIELD OF THE INVENTION

The present invention in general pertains to information processing wherein a physical memory and an arithmetic unit are shared when several programs are required to be run. The present invention more particularly pertains to a physical memory allocation system and a program execution scheduling system arranged in an information processor.

Recent developments in multiprogramming and virtual memory technology have enabled plural programs that are large in size to be run on a single computer, and the resources of the computer are shared when the programs are executed. The programs are stored in virtual memory on a hard disk and in physical memory on a semiconductor memory. On the execution of the programs, the allocation of an arithmetic unit is made depending on the program execution priority.

Figure 5:
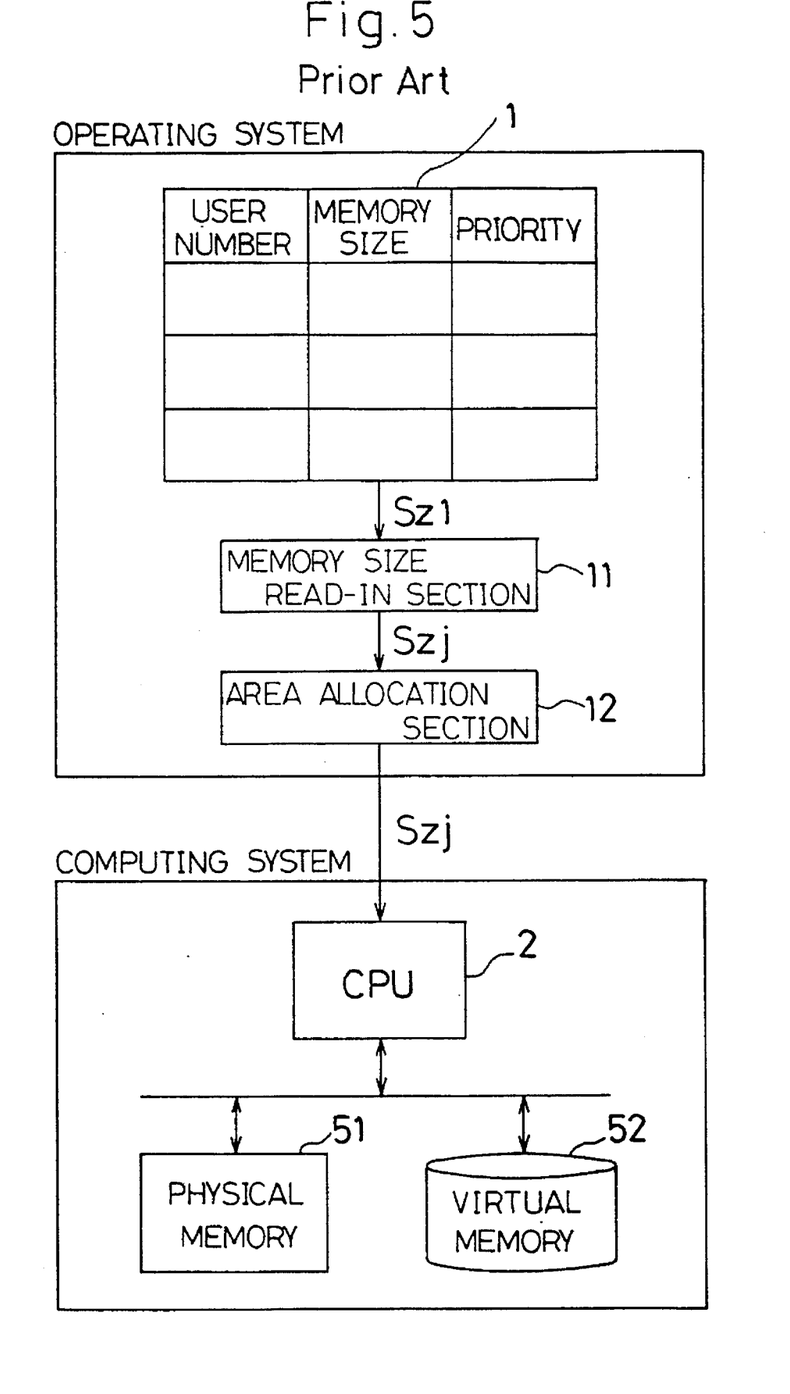
FIG. 5 is a block diagram depicting the organization of a conventional physical memory allocation system.

FIG. 5 schematically shows a conventional physical memory allocation system. In FIG. 5, Sz1 indicates a high-limit physical memory size that is allocated to a respective user who runs a program (hereinafter called USER ALLOCATION SIZE Sz1). Szj indicates a high-limit physical memory size that is allocated at program execution time (hereinafter called AT-EXECUTION-TIME ALLOCATION SIZE Szj). Pg indicates a program to be run (hereinafter called PROGRAM Pg). A user control table 1 holds information such as USER ALLOCATION SIZE Sz1 and program execution priority. A memory size read-in section 11 fetches USER ALLOCATION SIZE Sz1. An area allocation section 12 allocates an amount of physical memory to a program at execution time. A physical memory 51 stores a part of programs that are copied from a virtual memory. The virtual memory on a hard disk is indicated by reference numeral 52. An arithmetic unit 2 runs programs that are stored in the physical memory 51 and the virtual memory 52.

Figure 6:
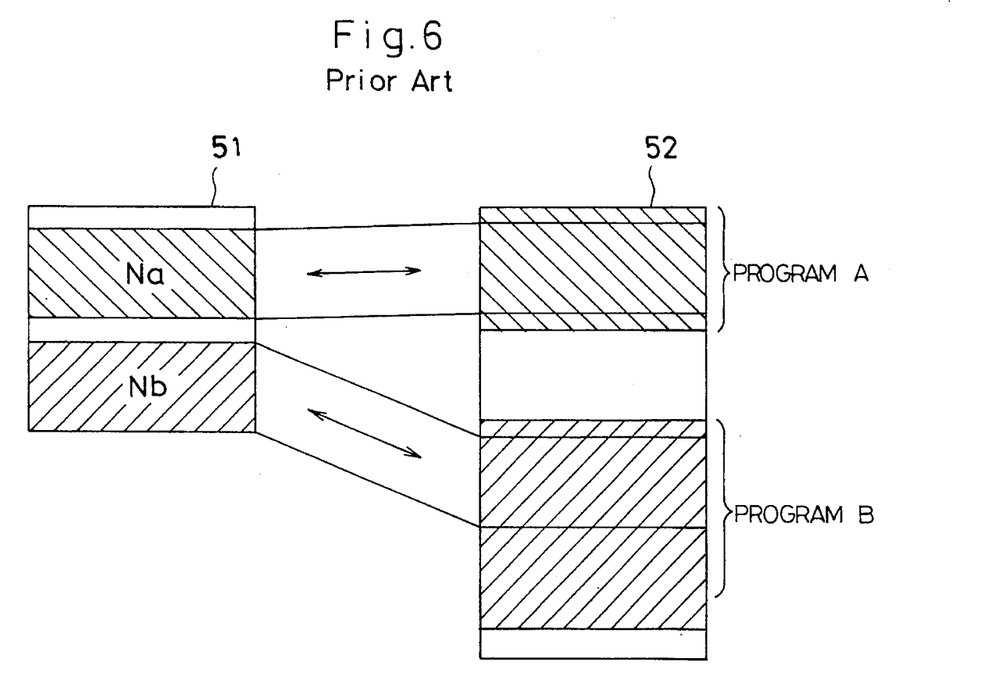
FIG. 6 is a memory map generated by a conventional physical memory allocation system.

FIG. 6 shows a memory map by a conventional information processor. In FIG. 6, ZONE Na represents a part of PROGRAM A that is copied into the physical memory 51 from the virtual memory 52, and ZONE Nb represents a part of PROGRAM B that is copied into the physical memory 51 from the virtual memory 52.

The operation of a conventional information processor having the above-described organization is now explained.

In the program execution based on a conventional virtual storage technique, the user control table 1 holds computer's resource allocation information necessary for program execution such as information about physical memory allocation, and arithmetic unit allocation. USER ALLOCATION SIZE Sz1, held in the user control table 1, is a high-limit physical memory size available at program execution time. USER ALLOCATION SIZE Sz1 is input to the memory size read-in section 11 and then delivered to the area allocation section 12 at program execution time as AT-EXECUTION-TIME ALLOCATION SIZE Szj. Only a selective part of PROGRAM Pg (i.e., a part of PROGRAM Pg that is required when executed) is copied to the physical memory 51 from the virtual memory 52. Instructions and data of PROGRAM Pg stored in the physical memory 51 are input to the arithmetic unit 2 and the execution of PROGRAM Pg begins. The total internal physical memory size occupied by PROGRAM Pg is controlled so that it is held below AT-EXECUTION-TIME ALLOCATION SIZE Szj given by the area allocation section 12. This prevents a single program from exclusively occupying the physical memory 51 when several programs are run at the same time. This means that, when PROGRAM A and PROGRAM B are run by the same user, ZONE Na and ZONE Nb vary, taking AT-EXECUTION-TIME ALLOCATION SIZE Szj as a high-limit physical memory size. If the physical memory 51 has an unused storage area, however, an allocation of physical memory exceeding AT-EXECUTION-TIME ALLOCATION SIZE Sz1 may be placed on the physical memory 51 in some systems.

Additionally, if the physical memory 51 has an unused storage area, PROGRAM Pg is copied to such an unused storage area from the virtual memory 52. If the physical memory 51 has no unused storage areas at all, then portions of PROGRAM Pg are deleted from the physical memory 51, thereafter being sent back to the virtual memory 51 so as to create room Such deletion is done as follows. If a PROGRAM Pg is found to overuse the storage area of the physical memory 51 more than is specified by AT-EXECUTION-TIME ALLOCATION SIZE Szj, then this PROGRAM Pg becomes a candidate for deletion. On the other hand, if no PROGRAM Pg is found to overuse the storage area of the physical memory 51 more than is specified by AT-EXECUTION-TIME ALLOCATION SIZE Szj, then deletion is carried out by means of such techniques as LRU (least recently used memory)algorithm, FIFO (first-in, first-out) algorithm, and random algorithm. The deleted portions are sent back to the virtual memory 52. Such program exchange between physical memory and virtual memory is called "swapping". Swapping involves data transfer between the physical memory 51 and the virtual memory 52, therefore producing delays in the execution of PROGRAM Pg.

The modification of USER ALLOCATION SIZE Sz1 can be realized by preparing plural User environments with different USER ALLOCATION SIZES Sz1. The adjustment of USER ALLOCATION SIZE Sz1 is made by selecting one of the user environments with different USER ALLOCATION SIZES Sz1 depending on the object. In this way, the amount of physical memory required by the execution of PROGRAM Pg is controlled. In this way, swapping is controlled and thus plural programs can be executed effectively.

Figure 7:
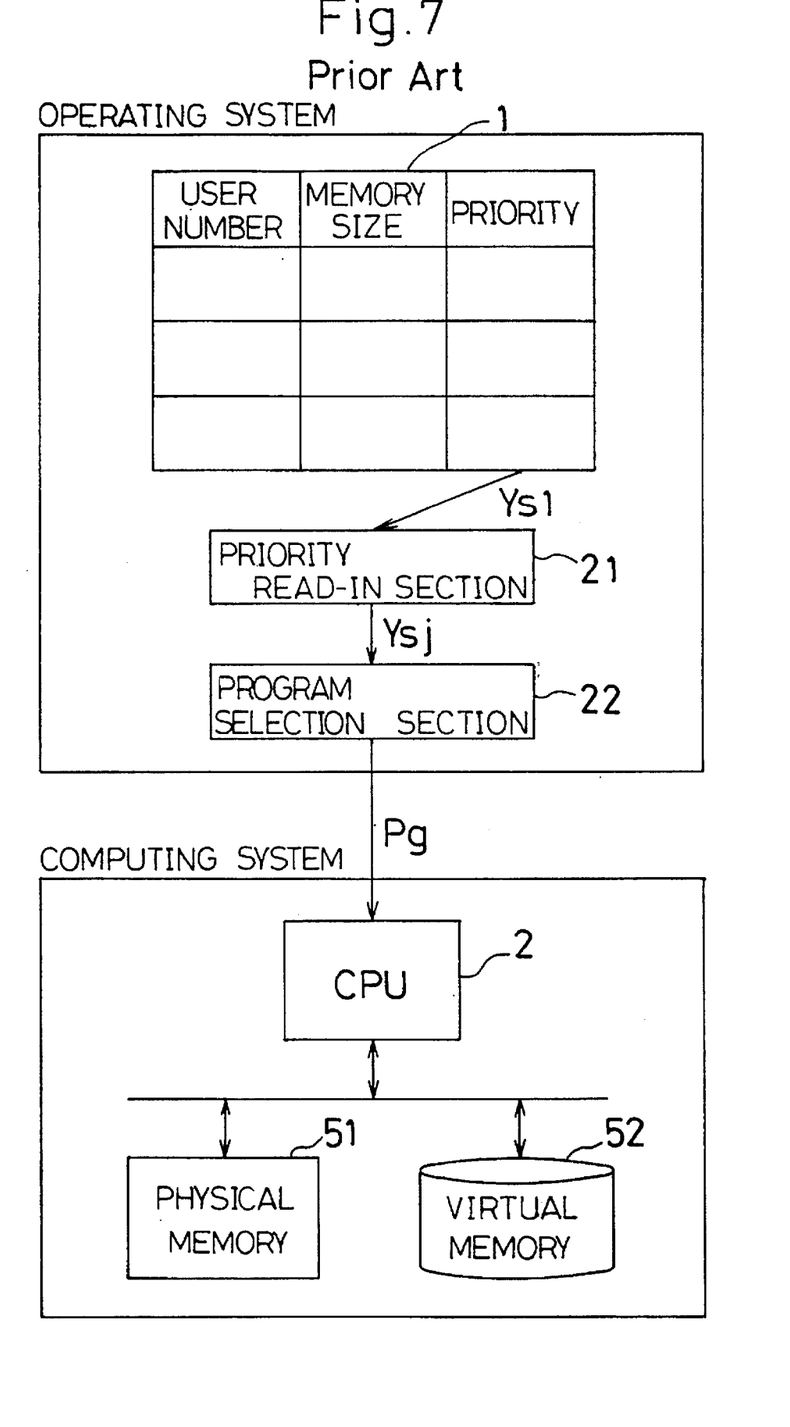
FIG. 7 is a block diagram depicting the organization of a conventional program execution scheduling system.

FIG. 7 schematically depicts a conventional program execution scheduling system. In FIG. 7, Ys1 indicates the order of priority ranking in which programs are executed (hereinafter called USER PRIORITY Ys1). USER PRIORITIES Ys1 for each user are set to the user control table 1 and held therein. Ysj is an indicator for preferential allocation of the arithmetic unit 2 at actual program execution time (hereinafter called AT-EXECUTION-TIME PRIORITY Ys1). A user priority read-in section 21 fetches USER PRIORITY Ys1. A program selection'section 22 is selects a PROGRAM Pg to run next according to AT-EXECUTION-TIME PRIORITY Ysj.

Figure 8:
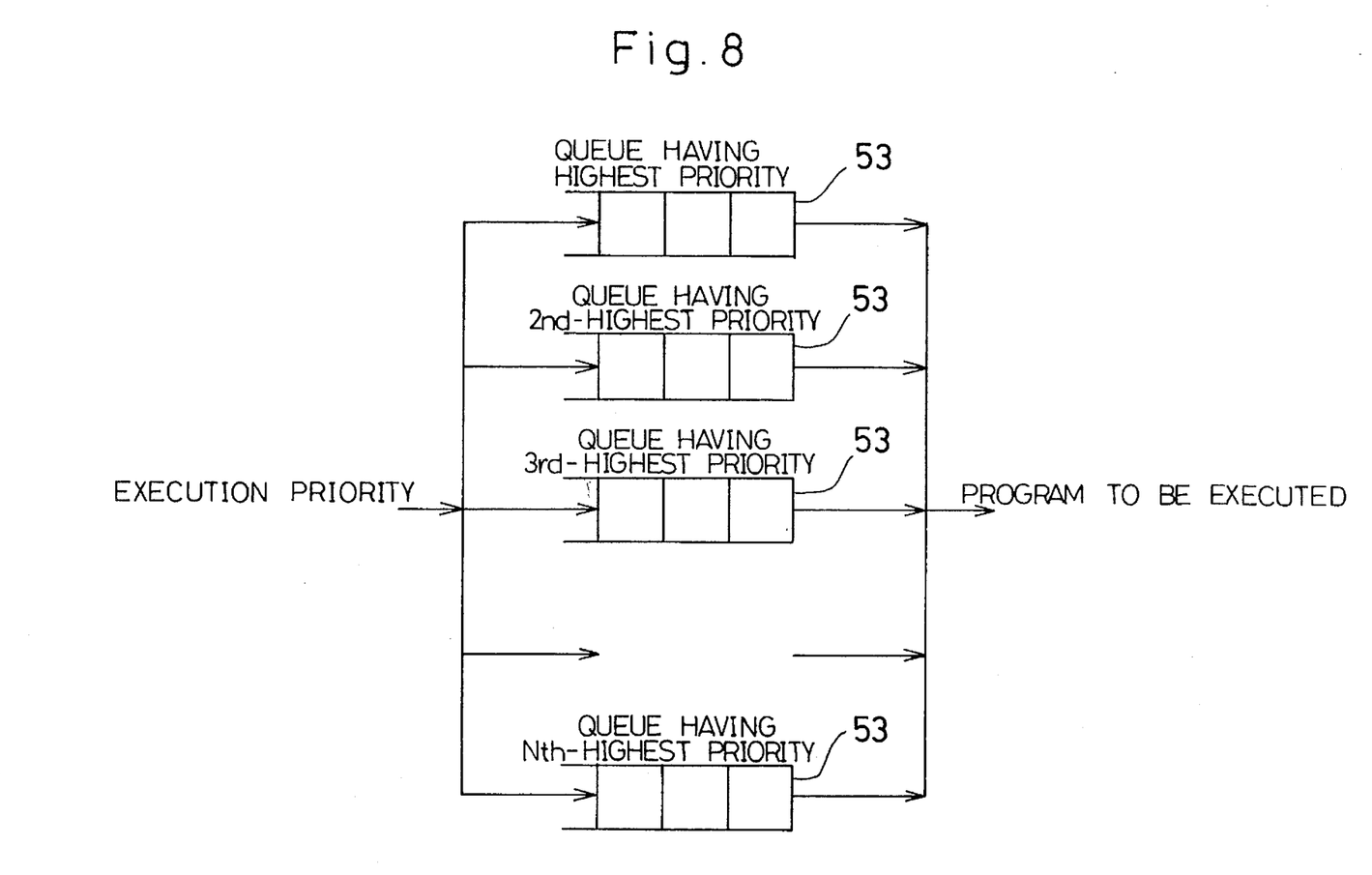
FIG. 8 is a block diagram depicting the organization of a program selection section of a program execution scheduling system.

FIG. 8 shows an operation model of the program selection section 22, in which each queue 53 accommodates programs having the same AT-EXECUTION-TIME PRIORITY Ysj.

How a conventional information processor having the above-described described organization on operates is now explained.

In the program execution based on a multiprogramming technique, plural programs are executed one after another in the order of priority. Each USER PRIORITY Ys1 is held at the user control table 1. USER PRIORITY Ys1 is input to the user priority read-in section 21 from the user control table 1 as AT-EXECUTION-TIME PRIORITY Ysj, then being delivered to the program selection section 22. In the program selection section 22, a PROGRAM Pg having the highest AT-EXECUTION-TIME PRIORITY Ysj is selected from among all the programs. The selected PROGRAM Pg is delivered to the arithmetic unit 2 for execution.

In the program selection section 22, a program is sorted out according to AT-EXECUTION-TIME PRIORITY Ysj and is placed at the end of a corresponding queue 53. In other words, programs having the same AT-EXECUTION-TIME PRIORITY Ysj have to wait in the same queue 53 for execution. Of all the programs awaiting their execution turn, an executable program that is waiting on the head end of the queue 53 having the highest AT-EXECUTION-TIME PRIORITY Ysj is selected and delivered to the arithmetic unit 2 for execution. If no executable programs exist in the queue 53 having the highest AT-EXECUTION-TIME PRIORITY Ysj, an executable program waiting in the different queue 53 having the second-highest AT-EXECUTION-TIME PRIORITY Ysj is selected and delivered to the arithmetic unit 2 for execution. The selected PROGRAM Pg is run by the arithmetic unit 2 just for a unit time. If the selected PROGRAM Pg has not finished within such a unit time, it is placed back to the end of the same queue 53 as before and must wait until its execution turn has come. In order to avoid exclusive execution that programs having the highest AT-EXECUTION-TIME PRIORITY Ysj are exclusively executed, AT-EXECUTION-TIME PRIORITY YsJ is subject to periodical recalculation on the basis of past data about how long the arithmetic unit 2 had been used for each program execution. Therefore, a PROGRAM Pg found to have required less execution time is raised to a higher AT-EXECUTION-TIME PRIORITY Ysj, while a PROGRAM Pg found to have required more execution time is demoted to a lower AT-EXECUTION-TIME PRIORITY Ysj but not to below USER PRIORITY Ys1. In this way, the availability time of the arithmetic unit 2 is allocated according to USER PRIORITY Ys1, and program execution begins.

The modification of USER PRIORITY Ys1 can be made by preparing a plurality of execution environments having different USER PRIORITIES Ys1. This enables preferential program execution.

The above-described conventional information processor of FIG. 5, however, suffers from the following problems:

(i) USER ALLOCATION SIZE Sz1 is fixedly used even for a PROGRAM Pg that requires a small physical memory size for execution. Suppose the user runs several programs which are different in size at the same time. In such a case, regardless of the program size, each program is given about the same physical memory storage area specified by Sz1. This suppresses the storage area availability of the physical memory 51, and swapping may occur when running large programs because small programs may occupy thee large amount of physical memory. This causes some delays in program execution.

(ii) For USER ALLOCATION SIZE Sz1 to be changed, a plurality of execution environments must be prepared and the user must select between the prepared execution environments depending on the program. This is troublesome.

(iii) If the user whose USER ALLOCATION SIZE Sz1 is small begins a certain program without awareness of the fact that such a program uses a large amount of physical memory, this may result in the occurrence of swapping and produce delays in the execution of programs.

On the other hand, the conventional information processor, shown in FIG. 5, suffers from the following problems:

(i) Where plural programs are run by the same user, it is impossible to run a particular program in preference to all the other programs because all the programs have the same USER PRIORITY Ys1 for use Of the arithmetic unit 2.

(ii) For AT-EXECUTION-TIME PRIORITY Ysj to be changed, a plurality of execution environments must be prepared and the user must select between the prepared execution environments depending on the program. This is troublesome.

(iii) A program which uses a large amount of physical memory suffers more likely from program execution delays due to the occurrence of swapping as compared with a program which uses a small amount of physical memory even if these large and small programs have the same AT-EXECUTION-TIME PRIORITY Ysj.

Meanwhile, various techniques attempting to meet difficulties in program execution have been known from the following patent applications.

Japanese Patent Application, published under No. 57-21784, discloses a technique. In accordance with this technique, user-adjustable attributes are held per page in order to accomplish effective paging between virtual memory and physical memory. The user sets such attributes taking into account the frequency of page utilization. The priority of paging is determined depending on the attribute so that the paging can be carried out accurately. This technique, however, presents the problem that the designation of each page becomes difficult because a great number of pages are involved practically. Additionally, in cases where many users are involved, there are provided no functions to arbitrate differences in attribute setting methods between the users. If the attribute is set inadequately, this will not improve the paging function; on the contrary, the paging function may be decreased.

Japanese Patent Application, published under No. 62-276645, shows a technique. In this technique, the page size of logical space for accommodating programs is variable. If the logical-space page size is fixed, this presents several problems. For example, if the logical-space page size is large, some areas of the logical space remain unused in the case of small programs. As a result, the rate of logical space utilization is decreased. If the logical-space page size is large, then the logical space is divided into many Sections in the case of large programs. Use of the variable logical-space page size prevents mismatching between the program size and the logical-space page size thereby improving the rate of logical space utilization. With the logical-space page size whose value varies with the system operating state, the logical space is allocated to individual programs. In accordance with this technique, the logical-space page size is initially held at a high value and is reduced to a smaller one as the logical space becomes congested.

Japanese Patent Application published under No 1-161443, discloses a technique. In this technique, if a program contains an iterative structure including I/O processing, the priority of the program is raised to a higher rank before the iterative structure and is reduced after the iterative structure. Although programs involving a lot of input/output processing can be executed at high speeds, rising a particular program to a higher priority rank prevents the execution of other programs and may influence the operating system. Further, there are provided no functions to arbitrate differences in priority ranking between users. Therefore, it is likely that the same user always takes first preference over the other users depending on the setting of user priority.

Bearing in mind the above-described problems accompanied with the prior art techniques, the present invention was made. Therefore, the general object of the present invention is to provide an improved physical memory allocation system and an improved program execution scheduling system arranged in a multiprogramming information processor. In the physical memory allocation system and the program execution scheduling system of the invention, (1) in stead of preparing a plurality of execution environments, a common execution environment is prepared, (2) physical memory within a computer is effectively used without being occupied by small programs, and (3) the arithmetic unit is preferentially allocated to a particular program that the user wishes to run. The present invention attempts to eliminate program execution delays.

SUMMARY OF THE INVENTION

The present invention discloses a physical memory allocation system having a physical memory and a virtual memory wherein the physical memory is organized in such a way that data stored in the virtual memory can be copied to the physical memory, and plural programs receiving execution requests are handled according to commands issued by a command means. This physical memory allocation system comprising:

(a) a memory size read-in section which inputs a physical memory occupation size allocated to a respective user who runs a program, the physical memory occupation size being a user allocation size, (b) an area estimation section which runs the program for a fixed period of time so as to measure a storage area referred to by the program, the measured storage area being a program size, (c) a program modification section which writes the program size estimated by the area estimation section to the program, (d) a program size read-in section which inputs the program size from the program at the time when the program is executed, and (e) a size compare section which receives outputs of the memory size read-in section and the program size read-in section for comparison in size between the user allocation size and the program size thereby outputting one of these two sizes that is found to be smaller than the other, the output size being an at-execution-time allocation size, wherein the command means receives an output of the size compare section to issue a command so that a specified amount of physical memory according to the at-execution-time allocation size is given when the program is executed.

As a result of the above-described arrangement, a program that requires a small physical memory storage area occupies less physical memory storage area. This produces room for storage in the physical memory. Further, even when running a program that requires a large physical memory storage area, this does not increase the frequency of swapping between physical memory and virtual memory. The loss of time due to the occurrence of swapping is reduced So that program execution delay is avoided. Therefore, the physical memory allocation is made effectively.

The present invention discloses a program execution scheduling system wherein plural programs receiving execution requests from users are handled according to commands issued by a command means. This program execution scheduling system comprising:

(a) a user priority read-in section which fetches a priority allocated to a respective user who runs a program, the priority being a user priority, (b) a priority-in section which inputs a priority applied by each user to the execution of each program, the priority being a program priority, (c) a priority modification section which, upon receipt of an output of the priority-in section, writes the program priority to each program, (d) a program priority read-in section which inputs the program priority from each program at program execution time, (e) a priority compare section which receives outputs of the user priority read-in section and the program priority read-in section for comparison in priority ranking between the user priority and the pro,ram priority thereby outputting one of these two priorities that is found to have a lower rank than the other, the output priority being an at-execution-time priority, wherein the command means issues, upon receipt of an output of the priority compare section, a command so as to select between the plural programs according to the at-execution-time priority.

As a result of such an arrangement, the at-execution-time priority will not be set above the user priority held at the user control table. This makes it possible for a particular program with the requirement of shift to a lower priority rank to be executed automatically at a lower priority rank as desired. In other words, it is possible to change the at-execution-time priority by user even in the case where the same program is executed by different users. Therefore, priority used to allocate the arithmetic unit by program can be held and thus the arithmetic unit can preferentially be allocated to a particular program that the user Wishes to execute. The program selection proceeds smoothly, and program execution delay can be avoided.

In the present invention, the physical memory allocation system and the program execution scheduling system described above are combined to form an information processor. The invention considerably reduces the time required for program execution.

PREFERRED EMBODIMENTS OF THE INVENTION

Embodiment 1

Figure 1:
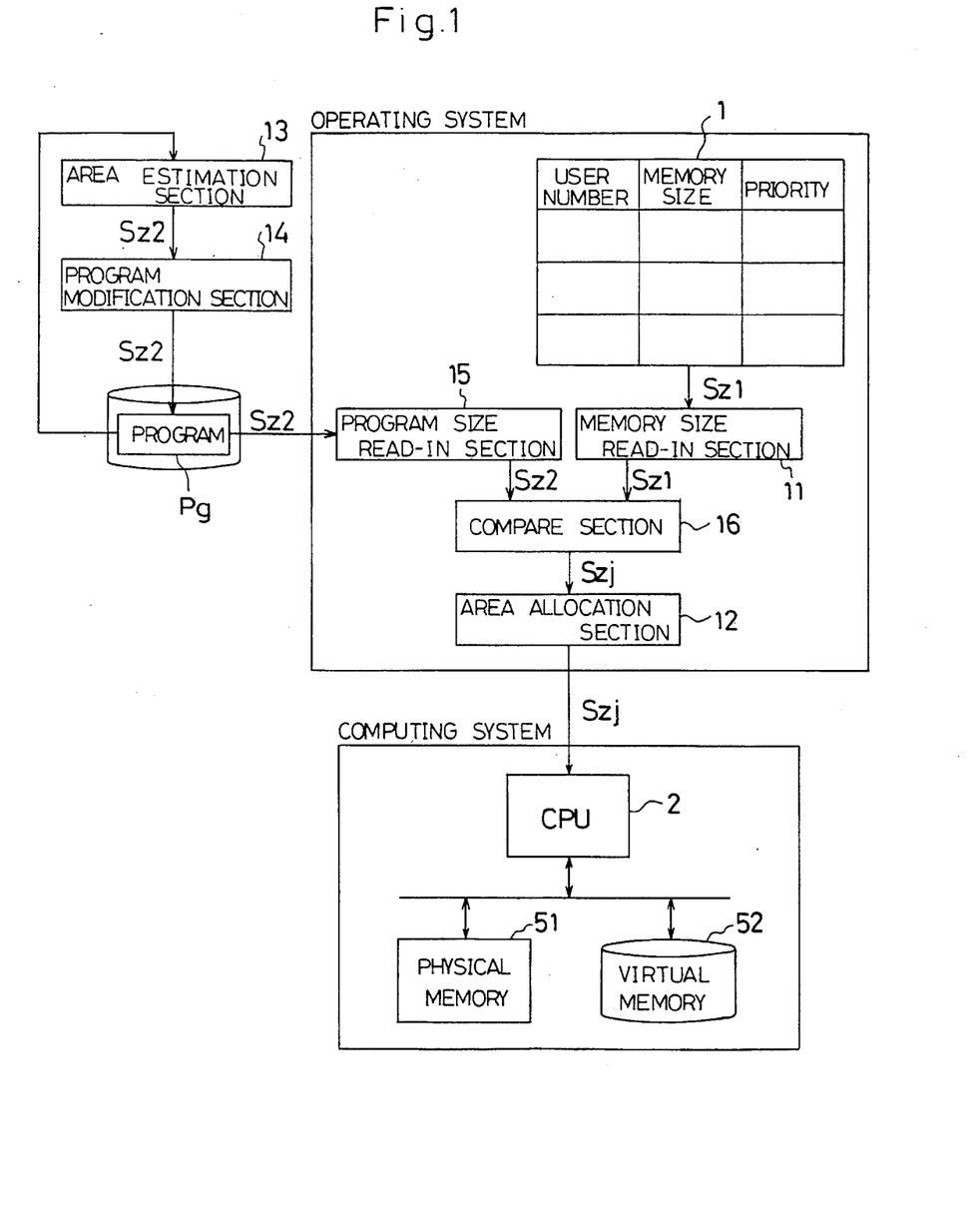
FIG. 1 is a block diagram depicting the organization of a physical memory allocation system according to a first preferred embodiment of the present invention.

A first preferred embodiment of the present invention is described. FIG. 1 is a block diagram of a physical memory allocation system of ah information processor according to the first embodiment. The physical memory allocation system of the present embodiment has the physical memory 51, the virtual memory 52, the user control table 1, and the arithmetic unit 2. Each user environment is assigned USER ALLOCATION SIZE Sz1 indicative of an allocation of physical memory. That is, each user environment is assigned a storage area of the physical memory 51 specified by USER ALLOCATION SIZE Sz1. USER ALLOCATION SIZE Sz1 is held by the user Control table 1. The memory size read-in section 11 fetches USER ALLOCATION SIZE Sz1. The area allocation section 12 allocates storage areas of the physical memory 51 at the time when Program Pg is executed.

In addition to these elements, the physical memory allocation system of the present embodiment further includes an area estimation section 13, a program modification section 14, program size read-in section 15, and a size compare section 16. The area estimation section 13 runs PROGRAM Pg to measure the size of a storage area referred to by PROGRAM Pg per unit time (hereinafter the measured storage area size is called PROGRAM SIZE Sz2). The program modification section 14 writes PROGRAM SIZE Sz2 estimated by the area estimation section 13 to PROGRAM Pg. The program size read-in section 15 inputs PROGRAM SIZE Sz2 from PROGRAM Pg at the time when PROGRAM Pg is executed. The size compare section 16 makes a comparison in size between USER ALLOCATION SIZE Sz1 and PROGRAM SIZE Sz2 and selects one of these two sizes that is found to be smaller than the other. The selected one is output as AT-EXECUTION-TIME ALLOCATION SIZE Szj.

Figure 2:
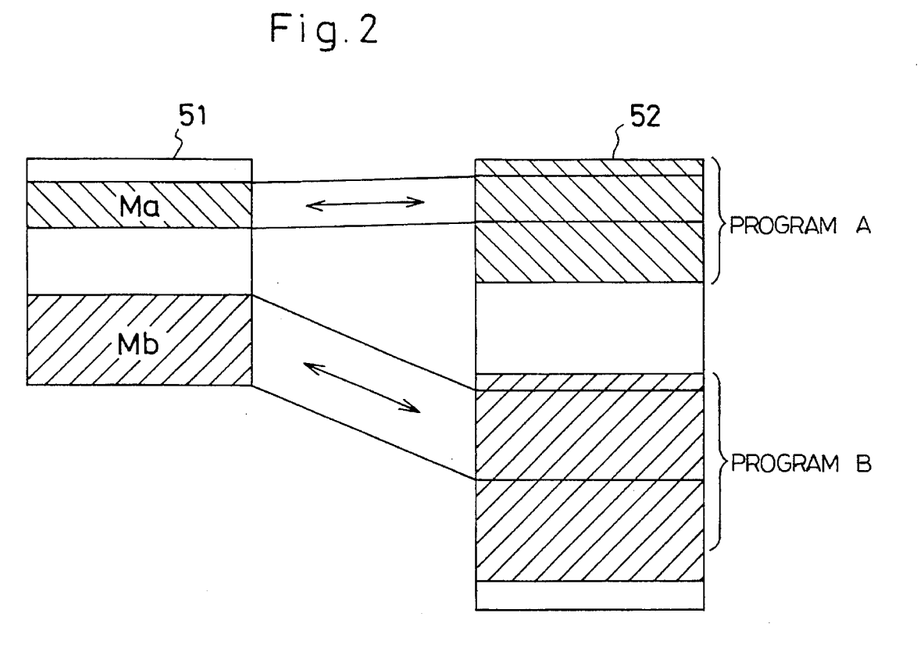
FIG. 2 is a memory map generated by the physical memory allocation system of FIG. 1.

FIG. 2 shows a memory map generated by the physical memory allocation system of the present embodiment. In FIG. 2, ZONE Ma indicates a part of PROGRAM A copied to the physical memory 51 and ZONE Mb indicates a part of PROGRAM B copied to the physical memory 51.

Figure 3:
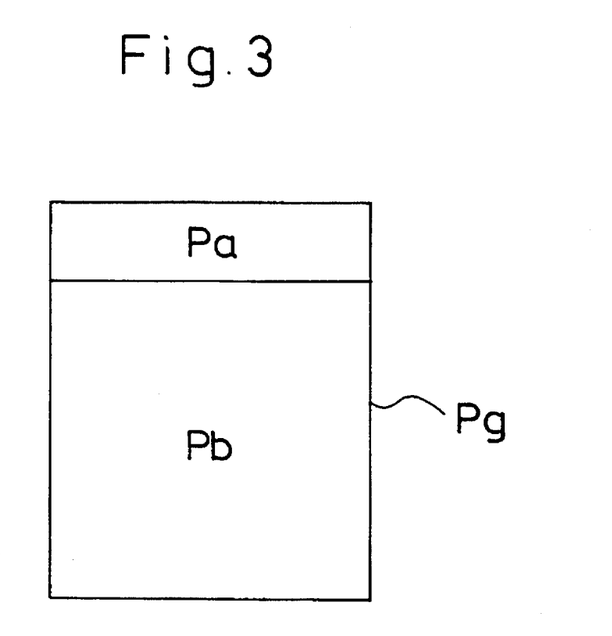
FIG. 3 schematically shows the structure of a program stored in a file storage device employed in the present invention.

Depicted in FIG. 3 is the structure of PROGRAM Pg stored in a file storage device formed by, for example, a magnetic disk. In FIG. 3, FIELD Pa is a header field containing description of program size and program priority while on the other hand FIELD Pb is a program field containing instruction streams and data streams.

The operation of the information processor with the above-described organization is explained.

Before program execution begins, PROGRAM Pg is experimentally run in the area estimation section 13 for a certain period of time. The size of a storage area that has been referred to by PROGRAM Pg is measured and the measured storage area size is PROGRAM SIZE Sz2. The storage area size referred to by PROGRAM Pg for a certain period of time varies with the PROGRAM Pg execution State. In order to eliminate size estimation errors caused by such variation, the storage area size referred to by PROGRAM Pg per unit time is measured a plurality of times, and an average of the results is used as the program size. The program modification section 14 pre-writes PROGRAM SIZE Sz2 estimated by the area estimation section 13 to PROGRAM Pg. The file storage device for accommodating PROGRAM Pg stores FIELD Pa to which PROGRAM SIZE Sz2 is written and FIELD Pb containing instruction streams and data streams of PROGRAM Pg which are the basic structure of PROGRAM Pg.

On the execution of PROGRAM Pg, the program size read-in section 15 inputs PROGRAM SIZE Sz2 written in FIELD Pa. This PROGRAM SIZE Sz2 is sent to the size compare section 16. The user control table 1 holds computer's resource allocation information necessary for program execution such as information about physical memory allocation, and arithmetic unit allocation. The memory size read-in section 11 fetches USER ALLOCATION SIZE Sz1 held at the user environment section 1. This USER ALLOCATION SIZE Sz1 is fed to the size compare section 16. The size compare section 16 makes a comparison in size between PROGRAM SIZE Sz2 and USER ALLOCATION SIZE Sz1, and one of these two sizes that is found to be smaller than the other is fed to the area allocation section 12 as AT-EXECUTION-TIME ALLOCATION SIZE Szj. Thereafter according to AT-EXECUTION-TIME ALLOCATION SIZE Szj from the size compare section 16, a high-limit physical memory storage area is allocated to PROGRAM Pg by the area allocation section 12.

PROGRAM Pg is copied from the virtual memory 52 to the physical memory 51 at execution time. Instructions and data of PROGRAM Pg existing in the physical memory 51 are fed into the arithmetic unit 2. Then, the execution of PROGRAM Pg starts. If a PROGRAM Pg is copied from the virtual memory 52 to the physical memory 51 and if the physical memory 51 has an unused storage area, the PROGRAM Pg is copied to such an unused storage area. If a PROGRAM Pg is copied from the virtual memory 52 to the physical memory S1 and if the physical memory 51 has no unused storage areas at all, any other PROGRAM Pg that is overusing the storage area of the physical memory 51 more than is specified by AT-EXECUTION-TIME ALLOCATION SIZE Szj is subject to deletion from the physical memory 51 and is sent back to the virtual memory 52. AT-EXECUTION-TIME ALLOCATION SIZE Szj is not determined exclusively by USER ALLOCATION SIZE Sz1. That is, for the case of a small PROGRAM Pg, the setting of SIZE Sz1 is made by taking into account the program size.

In accordance with the first preferred embodiment of the invention, a PROGRAM Pg that requires only a small storage area occupies a small area of the physical memory 51. As a result, the physical memory 51 comes to have room for storage. In other words, AT-EXECUTION-TIME ALLOCATION SIZE Szj is held at a low limit size depending on the program, and the physical memory 51 can be allocated effectively.

As a result of such arrangement, a small program is given a small high-limit physical memory size, and if PROGRAM A has a small program size, then ZONE Ma is controlled. On the other hand, if PROGRAM B has a large program size, ZONE Mb is set so as to allocate more physical memory storage area to PROGRAM B. Particularly, even when no unused storage areas are left in the physical memory 51, it is possible to handle an information content beyond the storage capacity of the physical memory 51 by changing program storage locations from the physical memory 51 to the virtual memory 52. If such program exchange is made too often, the loss of the due to the program transfer may increase. However, in accordance with the invention, room for storage is created in the physical memory 51 as described previously, so that the frequency of swapping will decrease even if a program that requires a large storage area is executed. Therefore, the loss of time due to swapping can be reduced effectively. Program execution delays can be prevented effectively.

If the size compare section 16 produces a compare result that PROGRAM SIZE Sz2 is greater than USER ALLOCATION SIZE Sz1, swapping is likely to occur when running a program in an environment that is allowed to use only a small amount of the physical memory 51 designated by USER ALLOCATION SIZE Sz1. In this case, a warning message may be issued to a user who runs the program so that the riser can select another execution environment that is allowed to use more physical memory.

Embodiment 2

Figure 4:
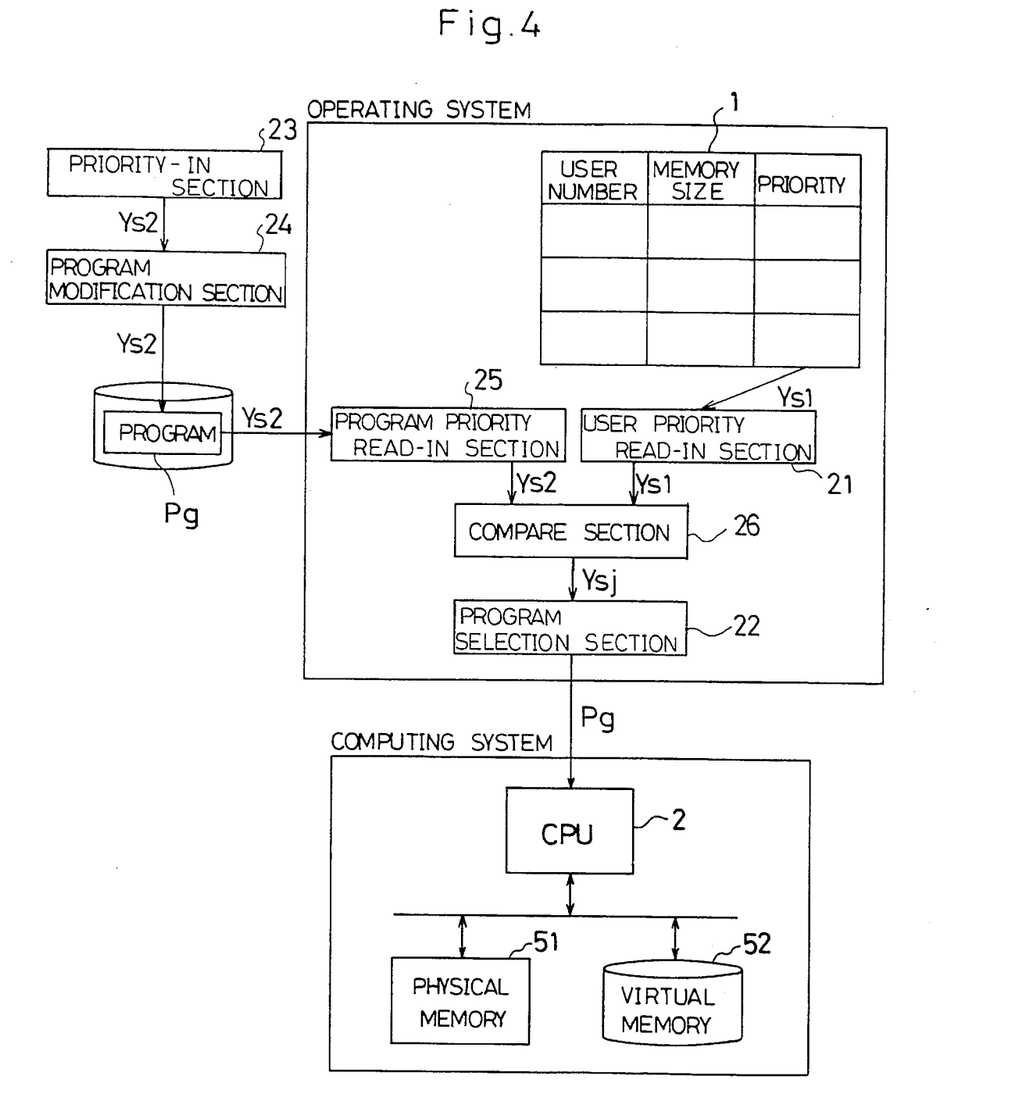
FIG. 4 is a block diagram depicting the organization of a program execution scheduling system according to a second preferred embodiment of the present invention.

A second preferred embodiment of the present invention is described. FIG. 4 schematically shows a program execution scheduling system of the second preferred embodiment. This program execution scheduling system comprises these elements: a user priority read-in section 21 which inputs USER PRIORITY Ys1 held by the user control table 1; a program selection section 22; a priority-in section 23 inputs PROGRAM PRIORITY Ys2; a program modification section 24 which writes PROGRAM PRIORITY Ys2 into PROGRAM Pg; a program priority read-in section 25 which inputs PROGRAM PRIORITY Ys2 Written into PROGRAM Pg; a priority compare section 26 which makes a comparison in priority ranking between USER PRIORITY Ys1 and PROGRAM PRIORITY Ys2 wherein one of these two priorities that is found to have a lower rank than the other acts as AT-EXECUTION-TIME PRIORITY Ysj; and a program selection section 22 which selects programs according to AT-EXECUTION-TIME PRIORITY Ysj. FIG. 4 further shows the arithmetic unit 2, the physical memory 51, and the virtual memory 52.

In a file storage device, PROGRAM Pg having the same structure as the one shown in FIG. 3 is stored. The operation model of the program selection section 22 is basically identical with the one of FIG. 8.

The operation of the above-described information processor is described below.

PROGRAM PRIORITY Ys2 is manually fed to the priority-in section 23 before program execution starts. The program modification section 24 pre-writes PROGRAM PRIORITY Ys2 into PROGRAM Pg. Based on the PROGRAM Pg structure, the file storage device stores FIELD Pb to which PROGRAM Pg instruction streams and data are written and FIELD Pa to which PROGRAM PRIORITY Ys2 is written. Here, PROGRAM PRIORITY Ys2 is written to FIELD Pa. On the execution of PROGRAM Pg the program priority read-in section 25 inputs PROGRAM PRIORITY Ys2 contained in FIELD Pa and this PROGRAM PRIORITY Ys2 is fed to the priority compare section 26. Meanwhile, the user priority read-in section 21 inputs USER PRIORITY Ys1 held at the user control table 1, thereafter this USER PRIORITY Ys1 being fed to the priority compare section 26. The priority compare section 26 makes a comparison in priority ranking between USER PRIORITY Ys1 and PROGRAM PRIORITY Ys2, wherein one of these two priorities that is found to be lower than the other becomes PRIORITY Ys3. Then, PRIORITY Ys3 is fed to the program selection section 22 as AT-EXECUTION-TIME PRIORITY Ysj. The program selection section 22 selects a PROGRAM Pg having a high AT-EXECUTION-TIME PRIORITY Ysj from among all the PROGRAMS Pg. The selected PROGRAM Pg is fed to the arithmetic unit 2 and the contents of the PROGRAM Pg are executed.

The programs are sorted out by the program selection section 22 according to AT-EXECUTION-TIME PRIORITY Ysj, which is shown in FIG. 8 and the sorted programs are fed to the arithmetic unit 2. AT-EXECUTION-TIME PRIORITY Ysj is re-calculated for every unit time on the basis of past data about how long the arithmetic unit 2 had been used for each program execution. Therefore, a PROGRAM Pg found to have required less execution time is raised to a higher AT-EXECUTION-TIME PRIORITY Ysj, while a PROGRAM Pg found to have required more execution time is demoted to a lower AT-EXECUTION-TIME PRIORITY Ysj but not to below PRIORITY Ys3. Therefore, the availability time of the arithmetic unit 2 is allocated according to PRIORITY Ys3, and program execution begins.

As a result of such an arrangement, AT-EXECUTION-TIME PRIORITY Ysj will not be set above USER PRIORITY Ys1 held at the user control table 1. This makes it possible for a particular PROGRAM Pg with the requirement of shift to a lower priority ranking to be executed automatically at a lower priority rank. In other words, it is possible to change the at-execution-time priority by user even in the case where the same program is executed by different users. Therefore, priority used to allocate the arithmetic unit 2 by program can be held as the at-execution-time priority. The arithmetic unit 2 can be allocated preferentially to a particular program that the user wishes to execute. Selecting programs proceeds smoothly, and program execution delay can be avoided.

In the second preferred embodiment, PROGRAM PRIORITY Ys2 is 25 manually fed to the priority-in section 23. However, as in the first preferred embodiment, the area estimation section 13 may be provided. In this case, the priority-in section 23 makes a comparison in size between each PROGRAM SIZE Sz2 estimated by the area estimation section 13 thereby giving a lower priority rank to the one having a smaller Sz2. Therefore, PROGRAMS Pg having a large PROGRAM SIZE Sz2 are much likely to be executed preferentially in such a condition where there is storage room in the physical memory 51. The frequency of swapping due to no storage room in the Physical memory 51 is decreased, and the loss of time due to swapping can be reduced.

What is claimed is:

1. A physical memory allocation system having a physical memory and a virtual memory wherein said physical memory is organized in such a way that data stored in said virtual memory are copied to said physical memory, and plural programs receiving execution requests are handled according to commands issued by command means, said physical memory allocation system comprising:

(a) a memory size read-in section which inputs a physical memory occupation size allocated to a respective user who runs a program, said physical memory occupation size being a user allocation size, (b) an area estimation section which runs said program for a fixed period of time so as to measure a storage area size referred to by said program, said storage area size being a program size, (c) a program modification section which writes said program size estimated by said area estimation section to said program, (d) a program size read-in section which inputs said program size from said program at the time when said program is executed, and (e) a size compare section which receives outputs of said memory size read-in section and said program size read-in section for comparison in size between said user allocation size and said program size thereby outputting one of these two sizes that is found to be smaller than the other as an at-execution-time allocation size, wherein said command means receives an output of said size compare section to issue a command so that a specified amount of physical memory according to said at-execution-time allocation size is given at the time when said program is executed.

2. The physical memory allocation system as in claim 1 wherein, when said program size is found to be greater than said user allocation size, said size compare section issues a warning message conveying such a condition to a user who runs a program.

3. The physical memory allocation system as in claim 2 wherein said warning message is displayed on a terminal display screen.

4. The physical memory allocation system as in claim 1 wherein said area estimation section measures a storage area size referred to by said program within a unit time a plurality of times to use an average of the measured storage area sizes as a program size at the time when said program is executed.

5. An information processor having a physical memory and a virtual memory wherein said physical memory is organized in such a way that data stored in said virtual memory are copied to said physical memory, and plural programs receiving execution requests are handled according to commands issued by command means, said information processor comprising:

(a) a user priority read-in section which fetches a priority allocated to a respective user who runs a program, said priority being a user priority, (b) an area estimation section which runs said each program for a fixed period of time so as to measure a storage area size referred to by said each program, said storage area size being a program size, (c) a priority-in section which, taking a priority referred to by each user to the execution of said each program as a program priority, makes a comparison in size between said program size of one program and said program size of the other program thereby lowering said program priority of a program found to have a smaller size, (d) a priority modification section which, upon receipt of an output of said priority-in section, writes said program priority to said each program, (e) a program priority read-in section which inputs said program priority from said each program at program execution time, and (f) a priority compare section which receives outputs of said user priority read-in section and said program priority read-in section for comparison in priority ranking between said user priority and said program priority thereby outputting one of these two priorities that is found to have a lower rank than the other as an at-execution-time priority, wherein said command means issues, upon receipt of an output of said priority compare section, a command so as to select between said plural programs according to said at-execution-time priority.

* * * * *